United States Patent [19]

Pitolaj

[11] Patent Number: 4,961,891
[45] Date of Patent: Oct. 9, 1990

[54] METHOD OF MAKING HIGH COMPRESSIBILITY GASKET MATERIAL

[75] Inventor: Stefan Pitolaj, Palmyra, N.Y.

[73] Assignee: Garlock, Inc., Palmyra, N.Y.

[21] Appl. No.: 436,797

[22] Filed: Nov. 15, 1989

Related U.S. Application Data

[62] Division of Ser. No. 253,185, Oct. 4, 1988, Pat. No. 4,900,629.

[51] Int. Cl.⁵ .................. B29C 65/02; B32B 27/06
[52] U.S. Cl. .................................. 264/113; 264/112; 264/127
[58] Field of Search ............... 264/113, 122, 127, 112, 264/86

[56] References Cited

U.S. PATENT DOCUMENTS

| | | | |
|---|---|---|---|
| 2,782,180 | 2/1957 | Weidman | 264/122 |
| 3,278,673 | 10/1966 | Gore | 264/127 |
| 3,524,794 | 8/1970 | Jonnes et al. | 428/313.3 |
| 3,901,315 | 8/1975 | Parker et al. | 166/321 |
| 4,042,747 | 8/1977 | Breton et al. | 428/323 |
| 4,153,661 | 5/1979 | Ree et al. | 264/120 |
| 4,364,884 | 12/1982 | Traut | 264/118 |

Primary Examiner—Jan H. Silbaugh
Assistant Examiner—Mary Lynn Fertig
Attorney, Agent, or Firm—Sixbey, Friedman, Leedom & Ferguson

[57] ABSTRACT

A highly compressible gasket material is formed by fusing two filled sheets of PTFE containing dispersed microballoons to a central unfilled sheet of PTFE which provides tensile strength to the material. The two unfilled sheets each constitute from 20% to 25% of the overall thickness of the gasket material. This method provides a unitary gasket assembly having an overall compressibility of 45% or more, but the thicker unfilled PTFE central area of the assembly provides excellent recovery characteristics and resistance to creep relaxation.

9 Claims, 2 Drawing Sheets

METHOD OF MAKING HIGH COMPRESSIBILITY GASKET MATERIAL

TECHNICAL FIELD

This is a divisional application of Ser. No. 253,185 filed Oct. 4, 1988, now U.S. Pat. No. 4,900,629.

The present invention relates generally to gasketing materials which operate to provide an effective seal in severe or corrosive operating environments, and more particularly to an improved gasket structure, and process for forming a gasket structure which operates effectively in severe environments but which provides high deformability and compressibility to assure a tight, lasting seal when subjected to minimal pressure.

BACKGROUND ART

For many years, attempts have been made to develop gasket materials and configurations which provide an effective seal between two adjoining surfaces under a wide range of temperatures and pressures and a variety of environmental conditions. Initially, attempts were made to develop gasket configurations having both a high resistance to relaxation or compression set and high deformability and compressibility characteristics. In pursuit of these goals, various composite gasket structures were developed in an attempt to exploit the desirable characteristics of different materials incorporated in the composite gasket. For example, U.S. Pat. No. 2,584,959 to A.M. Yocom et al discloses a cork containing composite gasket material which incorporates a layer of asbestos-rubber and one or more layers of cork. Rubber-asbestos has a high resistance to relaxation or compression-set but lacks conforability unless it is subjected to high pressures. Cork, on the other hand, exhibits high conformability at low pressures but also has a low resistance to relaxation or compression set.

In recent years, opposition has been raised to the use of asbestos as a gasket material and, consequently, manufacturers began experimenting with alternative constructions in an effort to replace or eliminate asbestos. The Jonnes et al U.S. Pat. No. 3,524,794 illustrates a composite fluid sealing gasket designed to provide both high conformability under pressure conditions and a high resistance to relaxation or compression-set. This gasket includes a layer formed of hollow, rigid, collapsible particles which are fully embedded in an elastomeric binder. The particles are hollow glassy spheroids (microbubbles) which collapse in response to pressure. Two layers of elastomeric binder with embedded microbubbles may be bonded to a central, strength-imparting film, which may be elastomeric or non-elastomeric, to form a laminate.

The prior art composite gasket assemblies illustrated by these patents operate effectively for many normal gasket applications, but such gaskets are not adapted for use in severe or corrosive operating conditions. For example, many chemical applications require gasketing material which will not deteriorate when subjected to chemicals which range from mildly to severely corrosive and the same gasketing material must also be resistant to attack by aggressive atmospheres where wide temperature ranges of from −350° F. to +500° F. may occur. In addition to withstanding severe operating conditions, such gasketing material must also meet the double requirement of being highly compressible and deformable to assure a tight, lasting seal in response to low flange pressures. For many applications where corrosive chemicals are present, glass lined conduits having glass lined flanges are provided, and the bolt-load pressure on the flanges must be low to avoid damaging the glass lining for the flange.

Recently, gasketing material containing polytetrafluoroethylene (PTFE) has been used in corrosive chemical environments. PTFE is inherently tough, has excellent chemical resistance and good tensile strength, and will withstand a wide range of temperatures. Although PTFE is chemically inert, it does not exhibit exceptionally high compressibility in response to low flange loading pressures and consequently, composite gasketing assemblies have been developed in an attempt to use the chemical resistant properties of PTFE while still enhancing gasket compressibility. Thus, envelope gaskets were developed wherein an outer envelope of PTFE was formed and was then filled with a more compressibile filler material such as compressed asbestos or other felted gasket filler. The PTFE jackets for the envelope gaskets provide chemical resistance while deformability is provided by the filler material.

Unfortunately, envelope gaskets are subject to a number of disadvantages. The envelope jacket often will fold over on itself during installation of the gasket, thereby creating creases in the gasket that cause leaks. Also, there may be pin hole leaks in the envelope itself, causing caustic material to attack the envelope filler from outside resulting in degradation of the filler. In some instances, the envelope jacket of PTFE will separate from the deformable filler material and ripples or folds may occur merely from stretching the envelope over the filler. Also, if uneven flange torquing occurs, the jacket may stress or burst, and envelope gaskets are subject to cold flow or creep which requires periodic bolt retorquing.

A major disadvantage of envelope gaskets is that the least compressible component, namely, the PTFE envelope is outermost, and this element is not highly deformable under low flange pressure loads. Too often, when a glass lined flange is torqued sufficiently to cause an envelope gasket to provide an effective seal, destruction of the glass lining for the flange results.

In an attempt to rectify some of the problems associated with envelope seals, a homogeneous PTFE gasketing material filled with microbubbles; i.e., glass microballoons, was developed. This material, as illustrated by Garlock Style 3504 gasketing manufactured by Garlock, Inc. of Palmyra, New York, uses glass microballoons to impart compressibility (25% to 35%) to a PTFE binder, thereby providing a more deformable gasket without the disadvantages experienced by multiple component gaskets. This homogeneous PTFE gasketing material exhibits enhanced compressibility and sealing characteristics due to the incorporation of microballoons, while maintaining the resistance to chemicals and the enhanced temperature characteristics provided by PTFE. However, the addition of the microballoons to the PTFE lowers the tensile strength properties which would be provided by pure PTFE gasketing.

DISCLOSURE OF THE INVENTION

It is the primary object of the present invention to provide a novel and improved high compressibility, composite gasketing material and method for making the same wherein the gasketing material will withstand severe operating conditions which involve widely variable temperature ranges and corrosive chemical environments. The gasketing material is compressible and highly deformable to assure a tight, lasting seal under low flange loading conditions.

Another object of the present invention is to provide a novel and improved high compressibility composite PTFE gasketing material which has excellent compressibility and recovery characteristics with improved creep relaxation resistance and tensile strength properties. The compressibility of the gasketing material is in excess of 45% and the material has an enhanced thickness and shape retention characteristic at elevated temperature under high external loads.

Yet a further object of the present invention is to provide a novel and improved high compressibility composite PTFE gasketing material and method for making the same wherein at least one layer of unsintered PTFE filled with glass microballons is calendered with an unfilled layer of PTFE, dried and then free-sintered at a temperature above the gel point of PTFE to fuse the PTFE layers and eliminate the possibility of separation or delamination.

A still further object of the present invention is to provide a novel and improved high compressibility composite PTFE gasketing material formed initially from three layers of material. The gasketing includes two outer layers of initially unsintered PTFE filled with glass microballons. These two outer layers are combined with an inner layer of pure PTFE by sintering to provide an essentially unitary structure with no definable laminated layers to delaminate or facilitate the ingress of corrosive material between layers. The outer surfaces of the gasket exhibit high deformability and compressibility, but the center layer imparts improved resistance to creep relaxation and extrusion and excellent tensile strength properties to the gasket structure. The center PTFE layer constitutes 50-60% of the overall thickness of the total gasket, while the outer compressible layers each constitute 20-25% of the total gasket thickness.

DESCRIPTION OF THE PREFERRED EMBODIMENT

Figure 1:
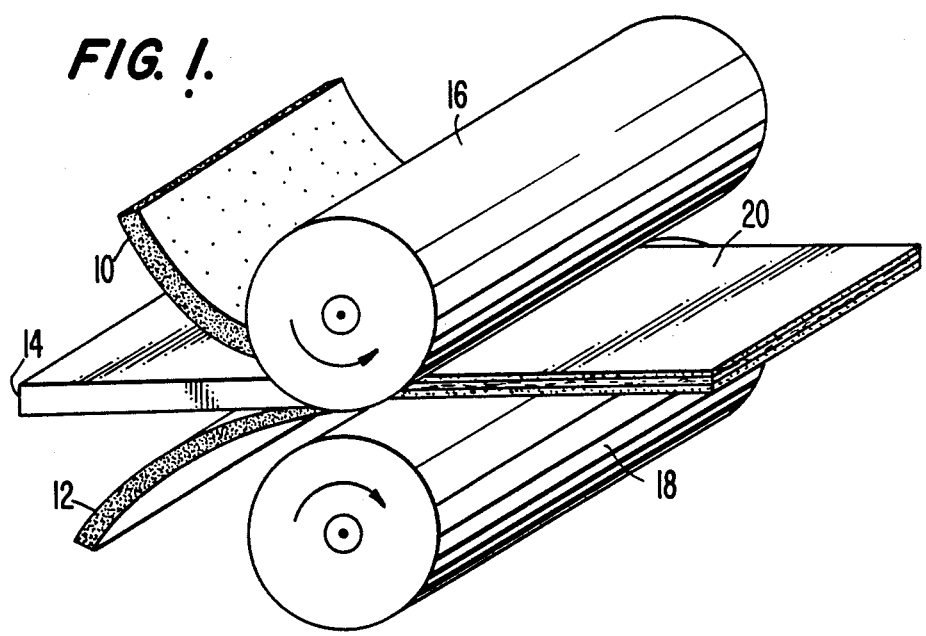
FIG. 1 is a perspective view of a calendering operation used in the formation of the high compressibilty composite gasket material of the present invention.

The method of the present invention is directed to the production of a gasket structure having unique properties which render the gasket particularly adapted for use in highly corrosive chemical environments where only minimal flange pressure is available to load the gasket. It has been found that for effective use in these environments, the gasket cannot be a true laminate having a plurality of layers which are adhesively joined, for adhesive joinder of gasket layers in this environment results in possible adhesive contamination problems and layer separation as well as the formation of leak paths between the layers of the laminate. On the other hand, in the development of a unitary gasket structure, it is imperative that the chemical resistant properties of the structure be maintained throughout the entire gasket, but in accordance with the present invention, the compressibility and deformability of the gasket material is made to vary significantly in specified areas of the gasket structure. Outer surfaces of the unitary gasketing material must be highly compressible or deformable in response to low bolt loading pressures applied to flanges which seat the gasket, must be stabilized and strengthened to provide good recovery and tensile strength properties as well as resistance to creep relaxation or extrusion.

To develop the unique highly compressible composite gasketing material of the present invention, a three-layer laminate is first formed which is subsequently united into a unitary gasket structure. In the formation of the outer sheets or layers of the laminate, polytetrafluoroethylene (PTFE) in fine powdered form and suitable glass microballoons are mixed with Stoddard solvent or another suitable liquid in a high-speed mixer to obtain a blend. The PTFE powder employed in the formation of the blend can be any suitable powder commonly used in the manufacture of PTFE gasketing materials, such, for example, as T-60 fine powder manufactured by DuPont.

The microballoons are added in an amount sufficient to constitute between 15-25% by weight of the blend, and ideally form between 18-21% of the total blend. The microballoons have an average particle size of 75microns, a specific gravity of between .20-.23 and a softening point of 1800° F. Microballoons designated as Extendospheres XL100 manufactured by P.A. Industries of Chattanooga, Tennessee are exemplary of the type of microballoons particularly adapted for use in the gasketing material of the present invention.

Once the PTFE blend containing the glass microballoons is thoroughly mixed, the blend is filtered to remove the Stoddard solvent and pressed to form a cake which is then calendered to form sheets. Each of these sheets consists of microballoons internally embedded in an unsintered PTFE matrix.

In addition to the microballoon filled sheets, it is necessary to provide a center or third sheet of PTFE formed in a conventional manner without microballoons. This third sheet will be at least twice the thickness of the microballoon filled sheets and may be formed by mixing PTFE powder with Stoddard solvent, filtering out the excess liquid and calendaring the resultant cake into sheet form to form an unsintered PTFE sheet. If desirable, known fillers such as silica can be mixed with the PTFE in the formation of the third sheet to obtain specific sheet properties in a manner known to the gasketing art, but in a preferred embodiment, this third sheet is an unfilled PTFE sheet.

Referring now to FIG. 1, once the microballoon filled sheets and the PTFE center sheet have been formed, they must be combined in a unitary structure. Thus, the microballoon filled sheets 10 and 12 are positioned on either side of the PTFE sheet 14, and these sheets are calendered between calendering rolls 16 and 18 to form a laminate 20. As previously indicated, the microballoon filled sheets 10 and 12 are each formed to be within the range of from 20-25% of the overall thickness of the resultant gasket material, while the central PTFE sheet 14 is within the range of from 50-60% of the overall gasket thickness. This is important, for if the sheets 10 and 12 are each formed to be below 20% of the overall gasket thickness, the finished composite sheet looses compressibility, while if they are formed to be above 25%, creep resistance and tensile strength are sacrificed in the finished product.

When initially formed, the laminate 20 is unsintered, but once formed, the laminate is sintered by subjecting it to temperatures above the gel point of PTFE. This gel point temperature is normally about 650° F., but before this temperature is reached, the PTFE in the sheets 10, 12 and 14 softens and becomes adhesive, and once the gel point is exceeded, a laminate no longer exists as the PTFE in the three original layers is now chemically fused. This eliminates any possibility of separation or delamination in the final gasketing material, as a unitary PTFE gasket has been formed.

Figure 2:
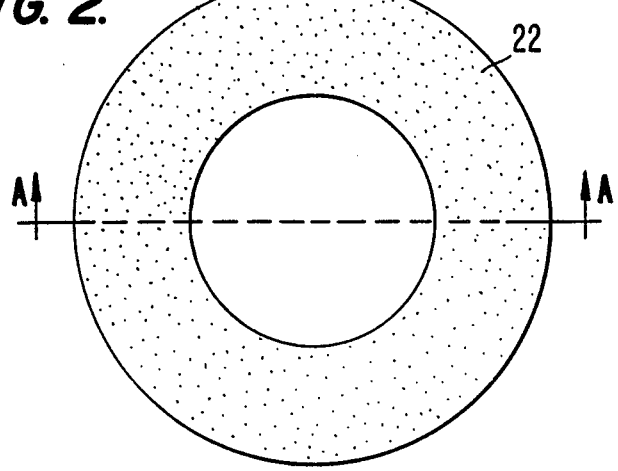
FIG. 2 is a plan view of a gasket formed from the high compressiblity composite gasketing material of the present invention.
Figure 3:
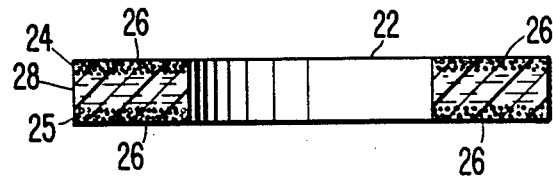
FIG. 3. is a sectional view taken along lines A—A of the gasket of FIG. 2.

Referring to FIGS. 2 and 3, gaskets of any shape may then be formed from the gasketing material, with a round gasket 22 for use in sealing a pipe flange being shown. As will be noted from the sectional view of FIG. 3, this round gasket has outer surface areas 24 and 25 which contain embedded microballoons 26 and a central area 28 which contains no microballoons but which imparts stability and tensile strength to the gasket. As previously indicated, the central area 28 is within the range of from 50-60% of the total gasket thickness, while the outer areas 24 and 25 are each within the range of from 20-25% of the total gasket thickness.

Figure 4:
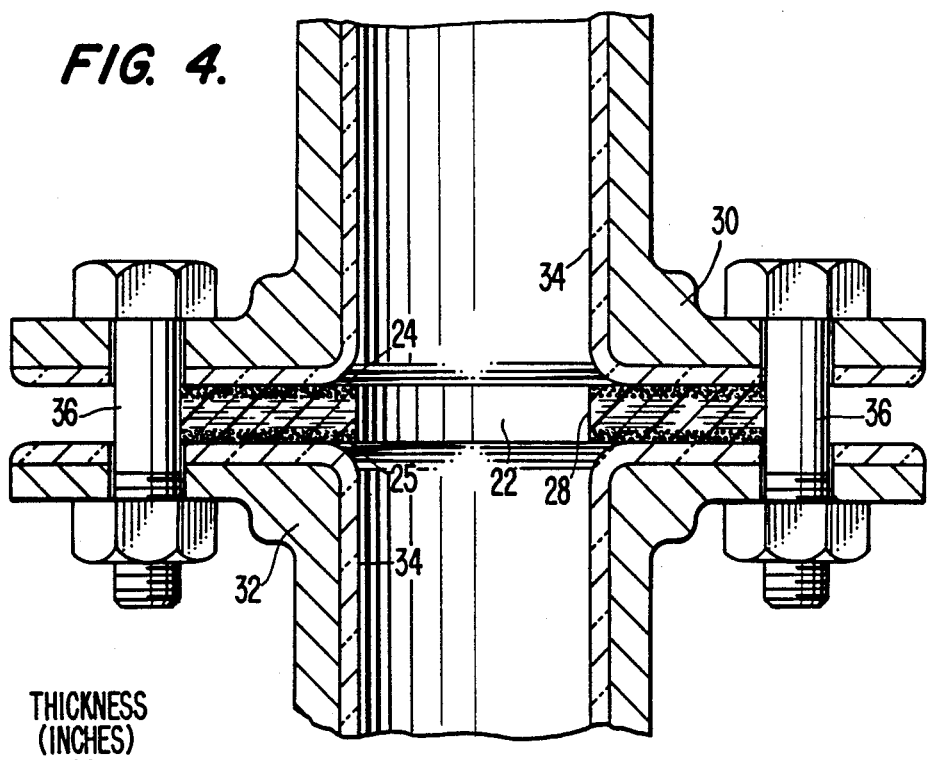
FIG. 4 is a sectional view of a glass lined pipe joint including the gasket of FIGS. 2 and 3.

Referring now to FIG. 4, the gasket 22 is shown in place between the flanges of two glass lined pipe sections 30 and 32. Each of these pipe sections includes a glass lining 34 which, as illustrated, extends out over the opposed flanges. The gasket 22 is positioned between the flanges, and then the flanges are bolted together by bolts 36. Normally, the surface of the glass lining 34 in glass lined pipes used for chemical applications is somewhat wavy, and this wavy surface must be effectively sealed. On the other hand, if the bolts 36 load the pipe flanges to an extent sufficient to cause conventional chemically resistant gaskets, such as pure PTFE gaskets, to seal the wavy glass surface, the resultant pressure often destroys or damages the glass lining. Conversely, if the gasketing material used is PTFE completely filled with microballoons, tensile strength, resistance to creep relaxation or extrusion, and recovery characteristics are sacrificed in the interest of compressibility.

Figure 5:
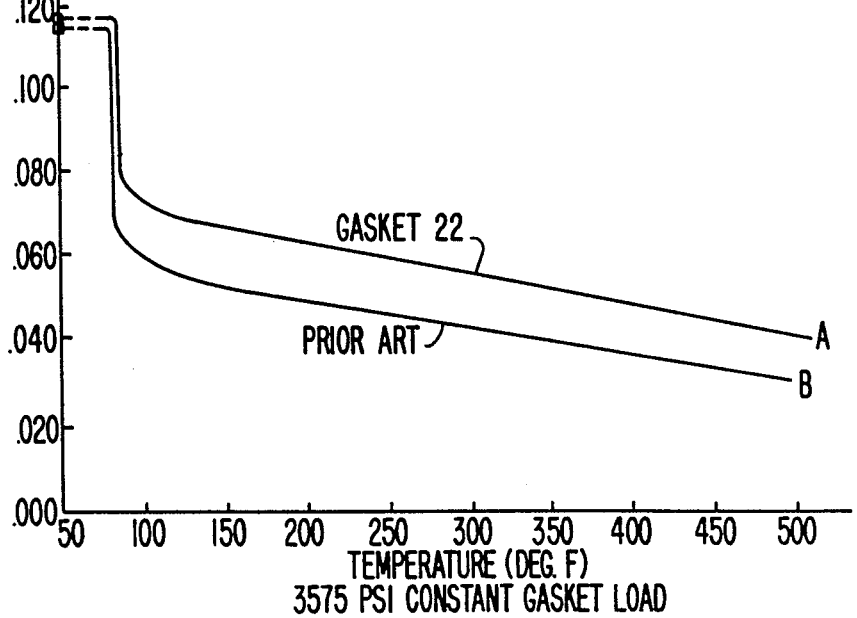
FIG. 5 is a comparison graph of a hot compression test for the high compressiblity composite gasket material of the present invention and a prior art gasket.

The graph of FIG. 5 illustrates the superior resistance to creep relaxation exhibited by the gasket material of the present invention when compared with a PTFE gasket wherein microballoons are mixed throughout the gasket. In hot compression tests where the gasket of the present invention was subjected to the same pressure load and temperature as a gasket of equal thickness with microballoons dispersed througout, the results indicated by the graph of FIG. 5 were obtained. Line A illustrates the creep relaxation experienced by the gasketing material of the present invention at various temperatures, while Line B illustrates a more significant creep relaxation which occurred with the microballoon filled gasketing material.

The gasketing material of the present invention has an overall tested compressibility in the range of from 45-50% with an average compressibility of 46.6%. Maximum compressibility occurs in the outer areas 24 and 25 of the gasket which constitute from 40-50% of the total gasket thickness. This soft, deformable exterior promotes sealing at low bolt loads, and deformation occurs easily to fill irregularities in flange surfaces. The stable inner area 28 of the gasket minimizes traditional cold flow and provides excellent pressure resistance.

INDUSTRIAL APPLICABILITY

The improved gasketing material of the present invention operates effectively in corrosive environments where temperatures within the range of from −350° F. to +500° F. are prevalent. Since the gasketing material does not comprise a laminate subject to separation, it can be employed in high vacuum surfaces without the fear of the gasket, or any part of the gasket, being pulled into the vessel or pipeline. The gasketing material operates effectively to seal the uneven surfaces of glass lined pipes without requiring flange pressure in an amount sufficient to damage the glass lining.

I claim:

1. A method for forming a gasket material which includes:
   forming first and second sheets of unsintered polytetrafluoroethylene having fully embedded, hollow, rigid collapsible particles dispersed therein and bonded thereto,
   forming a third sheet of unsintered polytetrafluoroethylene,
   positioning said third sheet between said first and second sheets to form a three layered structure,
   sintering said three layered structure at temperatures above the gel point of polytetrafluoroethylene to fuse the three layers into a unitary gasket structure.

2. The method of claim 1 which includes forming said third sheet to have at least twice the thickness of each of said first and second sheets.

3. The method of claim 1 which includes forming each of said first and second sheets to a thickness which is within the range of from 20% to 25% of the total thickness of said three layered structure.

4. The method of claim 1 which includes forming each of said first and second sheets so that said hollow particles constitute from 15% to 25% by weight thereof.

5. The method of claim 4 which includes forming each of said first and second sheets so that said hollow particles constitute between 18% and 21% by weight thereof.

6. The method of claim 5 which includes forming each of said first and second sheets to a thickness which is within the range of from 20% to 25% of the total thickness of said three layered structure.

7. The method of claim 1 which includes forming each of said first and second sheets by mixing polytetrafluoroethylene in powdered form with a liquid and glass microballoons and mixing the resultant composite to disperse the glass microballoons, filtering the composite to remove excess liquid therefrom and calendering the composite to form a particle containing sheet.

8. The method of claim 7 which includes adding said microballoons in sufficient quantity to form 15% to 25% by weight of said particle containing sheet.

9. The method of claim 8 which includes forming each of said first and second sheets to a thickness which is within the range of from 20% to 25% of the total thickness of said three layered structure.

* * * * *